United States Patent [19]

Graetz

[11] 4,011,715
[45] Mar. 15, 1977

[54] CHAIN LINK

[75] Inventor: Edward A. Graetz, Pound, Wis.

[73] Assignee: Graetz Manufacturing, Inc., Pound, Wis.

[22] Filed: Nov. 28, 1975

[21] Appl. No.: 635,874

[52] U.S. Cl. .................................... 59/85; 59/83; 59/90; 152/241; 152/243
[51] Int. Cl.² ........................................ F16G 15/04
[58] Field of Search ............. 59/85, 78, 83, 84, 86, 59/90, 35; 152/241, 243, 233, 244

[56] References Cited

UNITED STATES PATENTS

| 667,457 | 2/1901 | Rehfeld | 152/243 |
| 841,164 | 1/1907 | Mattassi | 59/85 |
| 891,153 | 6/1908 | Dowse | 59/85 |
| 2,785,578 | 3/1957 | Nold | 59/85 |
| 3,044,521 | 7/1962 | Pierre | 152/241 |

FOREIGN PATENTS OR APPLICATIONS 420,618 4/1947 Italy ....................... 59/85

Primary Examiner—Carl E. Hall
Assistant Examiner—Gene P. Crosby
Attorney, Agent, or Firm—James E. Nilles

[57] ABSTRACT

A chain link, a series of which can form a chain, the links having hook means at one end and a transverse bight at the other end whereby the hook means of one link can be detachably connected to the bight of an adjacent link. The hook means are formed by the ends of the legs of the link being turned back upon themselves so as to define a relatively narrow opening between the ends of the hooks and their respective legs. A transverse slot-like recess is formed in the legs adjacent the bight and at the end of the link opposite that on which the hook means are formed. The slot-like recess defines a narrower leg portion which is of a thickness less than the opening between the ends of the hooks in the legs so that in order to detach the chain links from one another, it is necessary to fold the links together so that the narrower leg portion can be slipped transversely through the relatively narrow opening of the hook means. This interlocking construction prevents inadvertent disengagement of the chain links. Some of the chain links may also have a reinforcing member welded between and to two transversely spaced apart hooks which form the hook means at one end of the link, such links being attaching links, that is to say, a load can be attached to either side of the link and the link is prevented from being inadvertently pulled apart or opened up. The links of the present invention are fabricated from a steel rod.

4 Claims, 12 Drawing Figures

CHAIN LINK

BACKGROUND OF THE INVENTION

Chain links fabricated from steel rods have been proposed heretofore and used with considerable success. However, some of these prior art chain links do have certain shortcomings, such as a tendency to become inadvertently disengaged from one another when the direction of the load on the chain is changed or when a certain amount of slack is permitted to develop in the chain. Furthermore, some of these other prior art chain links, while they were economically formed of steel rod stock, did not possess sufficient strength to prevent their deformation particularly when a side load, that is a transverse load to the direction of the chain, was applied.

SUMMARY OF THE INVENTION

The present invention provides a chain link fabricated from a steel rod and which is of generally U-shaped form having a transverse bight portion with a pair of legs extending therefrom. At the outer end of the legs a hook is formed by bending the leg ends back over the legs and which forms a relatively narrow opening between the end of the hook and its respective leg. The hooks are adapted to be detachably engaged on the transverse bight portion of the adjacent link and in order to prevent the accidental removal of the hooks from the transverse bight portion, the relatively narrow opening in the hooks is made smaller than the size of the bar stock from which the link is made. In order to permit disassembly of the links, a transverse slot-like recess is formed across the pairs of legs adjacent the transverse bight portion so that a narrower leg portion is formed that can be slipped transversely or sideways through the relatively narrow opening formed by the hooks and their respective legs. The transverse slot-like recess can only be positioned relative to the narrow opening, in order to permit the transverse separation of the links, when two adjacent links are folded back generally upon one another.

Another aspect of the invention relates to a chain link of the above type wherein a reinforcing member is welded to and between two transversely spaced hooks and prevent their transverse separation from one another, as for example, when a side load is attached to one of these reinforced chain links.

The present invention generally provides a particularly strong and rigid link for the size of the steel bar stock utilized and which links furthermore cannot be accidentally disengaged from one another, but instead the links must be moved to a definite folded position relative to one another in order to permit their separation by relative transverse movement.

These and other objects and advantages of the present invention will appear hereinafter as this disclosure progresses, reference being had to the accompanying drawings.

DESCRIPTION OF THE PREFERRED EMBODIMENT

Figure 1:
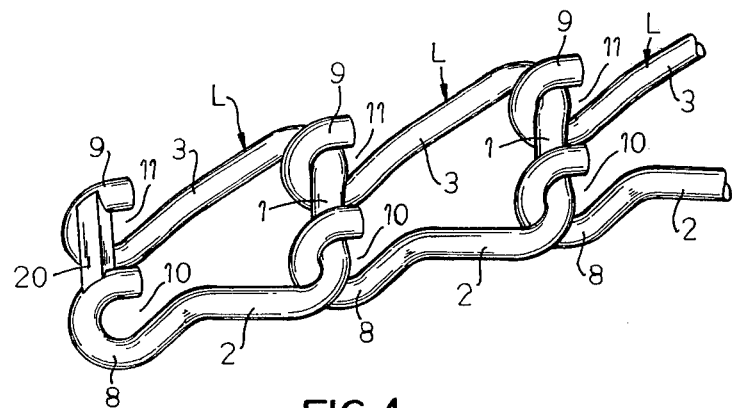
FIG. 1 is a perspective view of chain links embodying the present invention and in assembled relationship, one of the links being shown as broken away.
Figure 2:
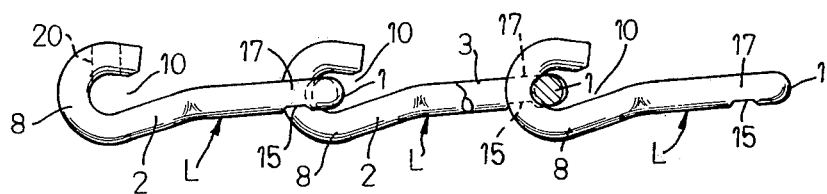
FIG. 2 is a side elevational view of the chain links shown in FIG. 1, certain parts being shown as broken away or in section for the sake of clarity.
Figure 9:
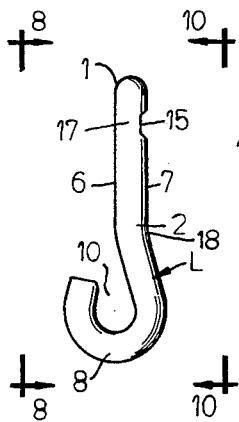
FIG. 9 is a view of the link shown in FIG. 8 and taken generally along the line 9—9 thereof.
Figure 10:
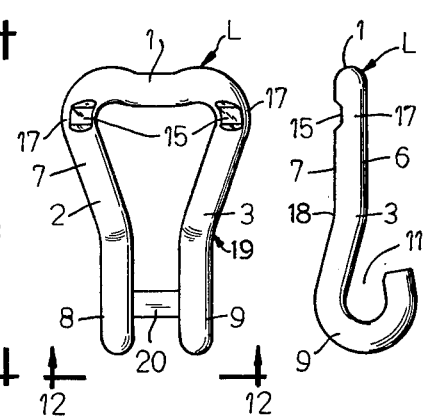
FIG. 10 is a view of the link shown in FIG. 9 but taken along the line 10—10 thereof.
Figure 11:
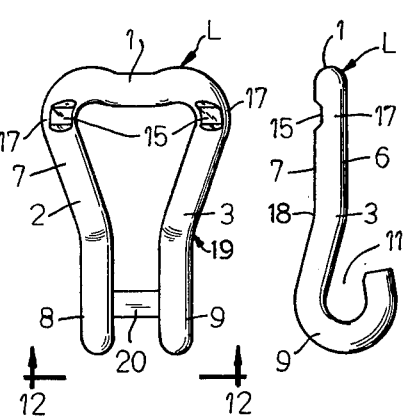
FIG. 11 is a view of the link shown in FIG. 8 but taken generally along the line 11—11 in FIG. 8.
Figure 12:
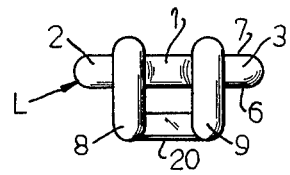
FIG. 12 is a view of the link shown in FIG. 10 taken generally along the line 12—12 in FIG. 10.

FIG. 1 illustrates a series of links L made in accordance with the present invention and when they are connected together to form a generally longitudinally extended chain, and FIG. 2 is a side elevational view of some links in assembled relationship. More specifically, the chain links are formed of a steel rod, shown here for purposes of illustration, as being of round cross section, and having a transverse bight portion 1 and a pair of legs 2 and 3 extending from opposite ends of the bight portion. Thus, the bight portion and legs form a generally U-shaped flat link having opposite, generally flat sides 6 and 7 (FIG. 11). A pair of hooks 8 and 9 are formed at the outer ends of the legs 2 and 3, respectively, as by being bent back generally on the legs, but having their ends spaced a distance therefrom, thus forming relatively narrow openings 10 and 11 between the hooks and their legs. These openings 10 and 11 are of a size as clearly indicated in FIG. 9 which is less than the diameter or overall width of the steel rod from which the link is made. As shown in FIG. 11, the hooks 8 and 9 extend generally from one of the flat sides 6 of the link and in a direction away from the other flat side 7.

The length $l$ (FIG. 8) of the bight portion is greater than the transverse distance $d$ defined by the hooks 8 and 9, thereby permitting the hooks to be located within the adjacent link and embracing the bight portion of that adjacent link as shown in FIGS. 1 and 2.

As mentioned, the relatively narrow openings 10 and 11 are narrower than the thickness of the transverse bight portion and therefore, when the transverse bight portion is located within the hooks, it would ordinarily be impossible to detach the adjacent links from one another. However, it is desirable to frequently detach the links and thus change the length of the chain or it is necessary to repair or otherwise replace the links. The present invention provides for being able to quickly and easily detach the links from one another and at the same time prevents inadvertent detachment of the links as follows.

A slot-like recess 15 is formed in each of the legs 2 and 3 and adjacent the bight portion, that is at the other end of the link from that on which the hooks are located. These transverse slot-like recesses 15 are furthermore located on the flat side 7 of the links (FIG.

Figure 3:
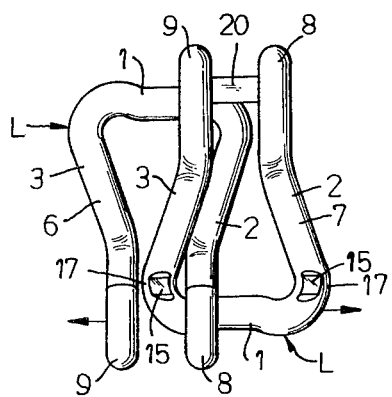
FIG. 3 is a view of two of the chain links when in partially disassembled relationship.
Figure 4:
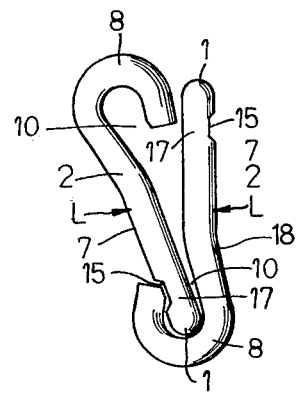
FIG. 4 is a side view of two of the links when swung to a position to enable them to be assembled or disassembled relative to one another.
Figure 5:
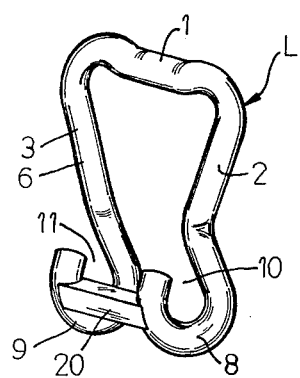
FIG. 5 is a perspective view of one of the links and taken generally from one side thereof.
Figure 6:
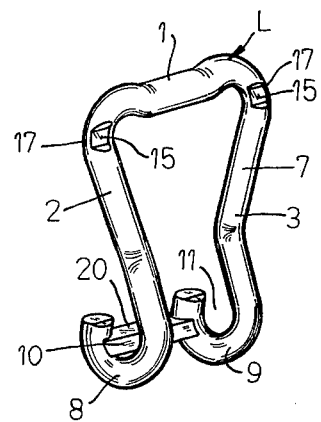
FIG. 6 is a view similar to FIG. 5, but taken generally from the opposite side thereof.
Figure 7:
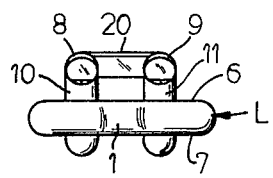
FIG. 7 is an end view of one of the links.

11) which is opposite to that flat side 6 of the links from which the hooks extend. Furthermore, the transverse slot-like recesses form a narrower leg portion 17 in the legs which is of a thickness that is less than the relatively narrower openings 10 and 11 of the hooks. Thus, when two adjacent links are folded over one another generally as shown in FIG. 4, the slot-like recesses 15 and more particularly, the narrow leg portions 17 lie adjacent the relatively narrow openings 10 and 11. As a result, as shown in FIG. 3, the two folded links can be moved in transverse opposite directions relative to one another, thereby permitting the narrow leg portions to slip through the relatively narrower openings of the hooks, thereby freeing the links from one another.

In order for the links to be able to assume the position shown in FIG. 4 and to permit the recesses 15 to pass through the tip of the hook, it is necessary for the legs 2 and 3 to be curved as at 18 so that, as shown in the upper portion of FIG. 4, the enlarged hook portion has enough clearance in respect to the end of the other link, to thereby permit the relative positioning as shown in FIG. 4. For the purpose of so bending the legs of the link with the curvature shown at 18, I provide a bend at that location with a radius of about one inch.

Figure 8:
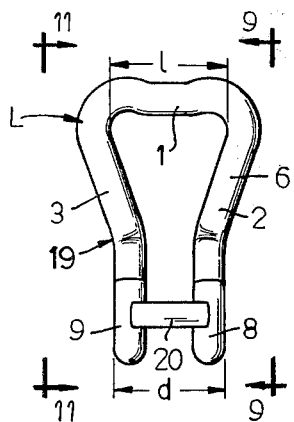
FIG. 8 is a side view of one of the links taken along line 8—8 in FIG. 9.

In addition, as shown in FIG. 8 for example, the legs are bent with a curvature indicated by numeral 19, in a plane which is about 90° from the bend 18 of the links and this curvature 19 I have found preferably to be in the neighborhood of a two inch radius. This defines, as viewed in FIG. 8, a portion of the link which has parallel sides and of relatively narrower size so as to be able to swing freely through the enlarged portion of the adjacent link when necessary.

In operation, when the links are in the position shown in FIG. 1 and a load is applied to the chain in a longitudinal direction, the links cannot become disengaged even if the load is suddenly released and the chain suddenly becomes slack or even if the chain is twisted about its longitudinal axis in one direction or another. In order to disengage the links, it is necessary to have slack in the chain and fold the links over one another as shown in FIG. 4 and then move them positively transversely or sideways relative to one another when the slot-like recess is aligned with the recess of the hook.

It is also sometimes desirable to attach a transversely extending load to the chain, that is to exert a transverse pull on one of the links. For this purpose, some of the links as shown in FIG. 1 have a steel reinforcing member 20 welded to and between the transversely spaced hooks and this prevents transverse separation of the hooks or more generally, it prevents the opening up of the U-shaped hook when a transverse load is applied to one of the hook legs.

I claim:

1. A generally U-shaped chain link fabricated from a rod of metal and having a transverse bight portion with a pair of legs extending therefrom, said legs each having a free end and having a hook formed at said free end, said hooks defining with their respective legs a relatively narrow opening, said legs adjacent said bight portion each having a transverse slot-like recess extending thereacross so as to form a narrower portion of said leg which is of a thickness less than said opening, said legs being curved and including a first portion adjacent said bight portion and a second portion adjacent said hook, the first portions of said pair of legs defining a first plane and the second portions of said pair of legs defining a second plane disposed at an angle with respect to said first plane whereby the links must be folded together completely to permit their separation and the length of said transverse bight portion being greater than the transverse distance defined by said hooks.

2. The link set forth in claim 1 further characterized in that said transverse slot-like recess is located on the side of said link opposite to that from which said hooks extend.

3. The link set forth in claim 1 further characterized in that a transverse, reinforcing member is welded to and between said hooks.

4. The link set forth in claim 3 further characterized in that said transverse slot-like recess is located on the side of said link opposite to that from which said hooks extend.

* * * * *